(12) United States Patent
Jakubowski, Jr. et al.

(10) Patent No.: US 6,758,441 B2
(45) Date of Patent: Jul. 6, 2004

(54) STORE EJECTION SYSTEM WITH REPLACEABLE PRESSURE VESSEL

(75) Inventors: Thaddeus Jakubowski, Jr., St. Charles, MO (US); John K. Foster, St. Peter, MO (US)

(73) Assignee: The Boeing Company, Seattle, WA (US)

( * ) Notice: Subject to any disclaimer, the term of this patent is extended or adjusted under 35 U.S.C. 154(b) by 74 days.

(21) Appl. No.: 10/205,570

(22) Filed: Jul. 25, 2002

(65) Prior Publication Data

US 2004/0016848 A1 Jan. 29, 2004

(51) Int. Cl.$^7$ ................................................. B64D 1/12
(52) U.S. Cl. ..................................... 244/137.4; 60/1.54
(58) Field of Search ....................... 244/137.4; 89/1.54, 89/1.51, 1.59; 294/82.26, 82.51

(56) References Cited

U.S. PATENT DOCUMENTS

| | | | |
|---|---|---|---|
| 3,787,012 A | | 1/1974 | Jakubowski, Jr. |
| 3,887,150 A | | 6/1975 | Jakubowski, Jr. |
| 4,043,525 A | | 8/1977 | Jakubowski, Jr. |
| 4,095,762 A | | 6/1978 | Holt |
| 4,204,456 A | | 5/1980 | Ward |
| 4,347,777 A | | 9/1982 | Jakubowski, Jr. et al. |
| 4,399,968 A | * | 8/1983 | Stock et al. |
| 4,552,327 A | * | 11/1985 | Carter |
| 4,553,719 A | * | 11/1985 | Ott |
| 4,608,907 A | * | 9/1986 | Ellis et al. |
| 4,746,083 A | | 5/1988 | Dupin et al. |
| 4,905,568 A | | 3/1990 | Hetzer et al. |
| 5,238,209 A | | 8/1993 | Hornyak |
| 5,409,187 A | | 4/1995 | Dunham |
| 5,411,225 A | | 5/1995 | Lannon et al. |
| 5,583,312 A | | 12/1996 | Jakubowski, Jr. |
| 5,857,647 A | | 1/1999 | Jakubowski, Jr. |
| 5,907,118 A | | 5/1999 | Jakubowski, Jr. et al. |
| 6,035,759 A | | 3/2000 | Jakubowski, Jr. et al. |
| 6,119,982 A | * | 9/2000 | Jakubowski et al. |
| 6,347,768 B1 | | 2/2002 | Jakubowski, Jr. et al. |

OTHER PUBLICATIONS

Ed Mygland; Pneumatic Ejector Relase Unit; Proceedings 8th JOCG Aircraft/Stores Compatibility Symposium, Oct. 23–25, 1990; pp. 32–14, 32–15 and 32–16; Fort Walton Beach, Florida.

* cited by examiner

Primary Examiner—Tien Dinh
(74) Attorney, Agent, or Firm—Alston & Bird LLP

(57) ABSTRACT

There is provided a store ejection system and method that use a pressurized non-pyrotechnic gas as the source of energy and transfer mechanism for jettisoning a store from an aircraft. The ejection system includes an on-board pressure vessel for holding the pressurized gas, a releasable seal configured to hermetically seal the pressure vessel, and a pressure regulator fluidly connected to the releasable seal and configured to control a flow of the gas from the pressure vessel when the releasable seal is configured in an open position. The pressure vessel is releasably connected to the pressure regulator and the releasable seal is configured to be released after the pressure vessel is connected to the pressure regulator so that the releasable seal hermetically seals the pressure vessel before the pressure vessel is connected to the pressure regulator. The ejection system also includes at least one actuation system and at least one pneumatically-driven jettison mechanism for releasably retaining the store.

13 Claims, 3 Drawing Sheets

STORE EJECTION SYSTEM WITH REPLACEABLE PRESSURE VESSEL

BACKGROUND OF THE INVENTION

1) Field of the Invention

The present invention relates to a system and method for ejecting stores from an aircraft and, more particularly, to a store ejection system and method that use a pressure vessel of pressurized non-pyrotechnic gas for providing the source of energy and the transfer mechanism to eject the stores from the aircraft.

2) Description of Related Art

The term "store" is used herein to refer generally to any of a number of munitions or other materials that can be dispensed from an aircraft. For example, military aircraft can include a store ejection system to dispense bombs, missiles, rockets, and other types of munitions. Non-munitions stores can include electronic equipment and other materials. Typically, the store ejection system includes one or more racks beneath the wings or fuselage of the aircraft for holding the stores and releasing the stores upon a command. For example, store racks are described in U.S. Pat. Nos. 5,907,118 and 6,035,759, both by the same inventor and assignee as the present invention.

In one conventional store ejection system, the stores are connected to the racks by one or more mechanical hooks. The store ejection system includes a release mechanism for actuating the hooks to release the stores and a jettison mechanism for forcibly ejecting the stores away from the aircraft. The jettison mechanism can include a pressure-actuator, such as a ram that is actuated by a pressure increase in a cylinder. In the conventional system, the pressure is generated by a pyrotechnic cartridge, i.e., an explosive. Ignition of the pyrotechnic cartridge initiates a chemical reaction that generates a high pressure, which can be used for actuating the release mechanism and the jettison mechanism.

Although such pyrotechnic cartridges provide a weight efficient unit for storing and releasing energy, the cartridges present a number of maintenance, reliability, and safety concerns. For example, the chemical reaction of the explosive charge in the cartridge generates a large amount of residue. Some of the residue is deposited in the ejection system where it can clog or otherwise interfere with the components of the ejection system. Moisture and corrosives in the residue can also damage the ejection system. Additionally, moisture deposited in the ejection system can freeze or gather additional debris. To avoid unreliability and possible failure, the ejection system must be disassembled and cleaned regularly, thus increasing the cost and downtime for maintaining the system. Such cleaning often requires the use of hazardous cleaning solvents that require care in storage, use, handling, and disposal. Further, due to the pyrotechnic nature of the cartridges, special storage and handling precautions for the cartridges are necessary. For example, ground crew personnel must use special equipment to conduct stray voltage checks before installing the cartridges to prevent inadvertent firing. Also, unspent cartridges must be removed before unloading unreleased stores from the aircraft.

Non-pyrotechnic ejection systems have been proposed, such as the pneumatically-driven store ejection system described in U.S. Pat. No. 5,583,312, which is also by the same inventor and assignee as the present invention. That device does not require pyrotechnic cartridges, but instead includes a compressor for compressing a non-pyrotechnic gas that is then used to actuate ejector pistons of one or more suspension and release equipment (S & RE) modules that releasably retain and jettison stores. The pressurized gas, which can comprise ambient air, does not deposit a significant amount of residue on the system components. Thus, the residue build-up and corrosion resulting from pyrotechnic chemicals are eliminated and the maintenance required on the system is minimized. However, the compressor adds to the initial cost of the system and the recurring costs for overhauling and maintaining the compressor. The compressor also adds to the overall weight of the system. Further, the compressor requires the availability of sufficient power from the aircraft's electrical or hydraulic systems to drive the compressor motor. In addition, the compressor must generate sufficient pressure to release the stores, so the compressor requires an interval of time for preparing the release of the store. The time required to achieve a sufficient pressure is dependent on the compressor, the number and size of ejector racks that are connected to the system, and the air density, which varies with altitude. Therefore, the release of the stores can be delayed while the compressor generates the required pressure.

There have also been proposed ejector devices that use a stored volume of compressed gas to provide the energy for ejection. For example, U.S. Pat. Nos. 4,095,762 and 4,905,568 to Holt and Hetzer et al., respectively, each describe an ejector mechanism that uses a pressurized gas as the energy source for ejection and a hydraulic fluid, which acts as the energy transfer mechanism for ejection. Both patents describe that the hydraulic fluid can be used to re-pressurize the gas after ejection. Holt specifies that the action of recocking a piston moves the hydraulic fluid and thereby re-pressurizes the gas. Hetzer recites that after ejection, a pump is used to pump the hydraulic fluid, and the hydraulic fluid thereby acts on the gas to re-pressurize it. Therefore, neither patent requires a compressor for re-pressurizing the gas. However, the hydraulic systems add weight and complexity to the system. Further, the pump of Hetzer for pumping the hydraulic fluid adds weight, power, and timing concerns similar to those discussed above in connection with the compressor of U.S. Pat. No. 5,583,312. Similarly, in the case of Holt, some additional device would be required for recocking the system.

U.S. Pat. No. 4,204,456 to Ward discloses a pneumatic bomb ejector that uses a pressurized gas from a storage container for the energy required to eject the bomb. However, no specific storage container is described, and there is no description regarding how and when the storage container is pressurized. Pressurizing the container during flight would require a pressurization device, such as a compressor, again with the weight, power, and timing concerns noted above. Alternatively, if the storage container is pre-pressurized before the aircraft takes off so that no on-board compressor is needed, the pressure in the storage container will fluctuate as the temperature of the gas in the storage container changes with the ambient temperature. Further, the pressure in the storage container will not be affected by changes in the ambient pressure. Thus, the differential in pressure between the storage container and the ambient air will change as the aircraft changes altitude, thereby changing the operational characteristics of the ejector and possibly resulting in incorrect or failed ejections. Additionally, refilling the container before take-off would require that the container be connected to a refilling device, which could delay the flight.

Thus, there is a need for a store ejection system and method that use a non-pyrotechnic gas as the source of energy and transfer mechanism for jettisoning a store from an aircraft. The system should not require the use of pyrotechnic reactions or an on-board compressor system. Preferably, the system should not require a long time delay to achieve pressurization. Additionally, the system should require little or no power from the aircraft's electrical or hydraulic systems for pressurizing the gas.

BRIEF SUMMARY OF THE INVENTION

The present invention provides a store ejection system and method that use a non-pyrotechnic gas as the energy and transfer mechanisms for jettisoning a store from an aircraft. The gas is held pressurized in an on-board pressure vessel so that no pyrotechnic reaction or on-board compressor is required for pressurization, thereby simplifying system maintenance, complexity, weight, and ejection timing. A pressure regulator controls the pressure of the gas delivered from the pressure vessel, even when ambient conditions vary. Further, the pressure vessel is releasably connected to the pressure regulator, and can therefore be removed after use for quick replacement or refilling. A releasable seal on the pressure vessel provides a hermetic seal until the pressure vessel is connected to the pressure regulator and the seal is released.

According to one embodiment of the present invention, a store ejection system is provided for mounting at least one jettisonable store on an aircraft. An on-board pressure vessel of pressurized non-pyrotechnic gas provides the source of energy and the transfer mechanism. According to one aspect of the invention, the pressure vessel defines an interior space of between about 10 and 250 cubic inches, and the pressure vessel can be pressurized to between about 3000 and 10,000 psi.

A releasable seal, which can be released from a closed position to an open position, is configured to hermetically seal the pressure vessel. The releasable seal can include, for example, a valve or a burst portion that can be destructively released, and the seal can be released by an actuator. The releasable seal is also fluidly connected to a pressure regulator. The pressure regulator controls a flow of the gas from the pressure vessel when the releasable seal is open. The releasable seal is configured to be released after the pressure vessel is connected to the pressure regulator so that the seal hermetically seals the pressure vessel before the pressure vessel is connected to the pressure regulator. According to one aspect of the invention, the releasable seal is configured to be released upon connection of the pressure vessel to the pressure regulator.

The ejection system also includes at least one actuation system and at least one pneumatically-driven jettison mechanism. Each actuation system includes an accumulator that is fluidly connected to the pressure regulator. The accumulator receives and stores the gas from the pressure vessel at a specified operating pressure. A dump valve, which controls the flow of gas from the accumulator, is actuated by a controller so that the dump valve can be opened in response to a control signal to jettison the store.

According to another aspect of the invention, the pressure regulator is adapted to control the flow of the gas from the pressure vessel and thereby maintain the specified operating pressure in the actuation system. According to yet another aspect, each actuation system includes a relief valve for venting the gas from a respective accumulator of each actuation system.

The jettison mechanisms, which releasably retain the stores, are fluidly connected to the dump valves so that actuating each dump valve to an open position releases the pressurized gas in a respective accumulator to flow to a respective jettison mechanism, thereby actuating the jettison mechanism to jettison the respective store. Each jettison mechanism can include at least one hook for releasably retaining the store, the hooks being actuated to release the store from the jettison mechanism by the pressurized gas exiting a respective accumulator through a respective dump valve. Additionally, each jettison mechanism can also include at least one ejector piston for forcibly jettisoning the store away from the aircraft when the hook has been actuated to a release position. The at least one ejector piston is also actuated to jettison the store by the pressurized gas exiting the accumulator through the dump valve.

According to one aspect of the invention, the ejection system includes a plurality of jettison mechanisms, a corresponding plurality of actuation systems, and a manifold line that fluidly connects the pressure vessel to each actuation system. A plurality of enable valves can also be provided. Each enable valve is fluidly connected to the manifold line and configured to control the flow of the gas from the pressure regulator to a respective actuation system.

The present invention also provides a method of ejecting stores from an aircraft using a gas as the source of energy and the transfer mechanism. The method includes releasably retaining at least one store with at least one pneumatically-driven jettison mechanism. An on-board pressure vessel of pressurized non-pyrotechnic gas is releasably connected to a pressure regulator. The pressure vessel can be pressurized and hermetically sealed with a releasable seal prior to its connection. The releasable seal of the pressure vessel is released such that the pressure vessel is fluidly connected to the pressure regulator. The seal can be released by destructively releasing a burst portion of the seal, for example, while connecting the pressure vessel to the pressure regulator. The pressure regulator is configured to an open configuration such that the gas flows from the pressure vessel to at least one accumulator fluidly connected to the pressure regulator, for example, to pressurize the accumulator to a specified operating pressure. A dump valve fluidly connected to one of the accumulators is actuated to an open position to fluidly connect the accumulator to one of the jettison mechanisms such that the gas flows from the accumulator to the jettison mechanism and thereby actuates the respective jettison mechanism to jettison a store. For example, the accumulator can be fluidly connected to at least one ejector piston such that the gas flowing from the accumulator actuates the at least one ejector piston to jettison the store. Each store can also be releasably retained with at least one hook, which is opened during the actuating step to release the store.

According to one aspect of the invention, the pressure regulator is opened when at least one of the accumulators requires pressurization to attain the specified operating pressure and closed when the specified operating pressure is attained. According to another aspect, a relief valve fluidly connected to one of the accumulators is opened to vent the gas from the respective accumulator when an over-pressure condition is detected in the respective accumulator or when it is desired to disarm a respective jettison mechanism.

After the dump valve has been actuated, the pressure vessel can be released from the pressure regulator and repressurized, followed by a repetition of the connecting, releasing, configuring, and actuating steps.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
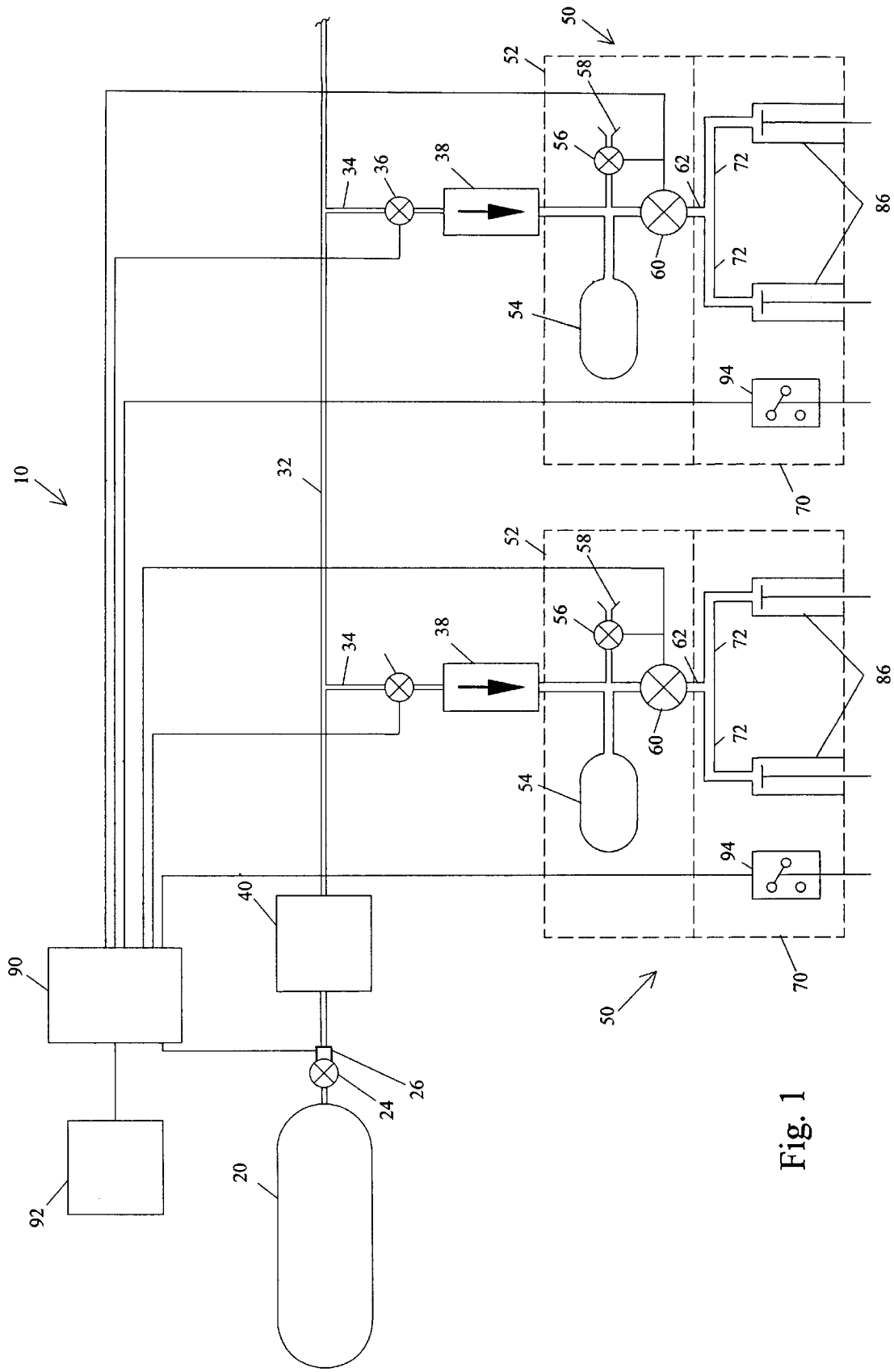
FIG. 1 is schematic view of the store ejection system according to one embodiment of the present invention.

Referring now to FIG. 1, there is shown a pneumatically-driven store ejection system 10 according to one embodiment of the present invention. The ejection system 10 is used to releasably mount at least one jettisonable store (not shown) on an aircraft. The store can comprise any object that is to be released from the aircraft, including munitions such as bombs, missiles, rockets, and the like, and non-munitions such as a surveillance, communication, or avionic devices. The ejection system 10 comprises an on-board pressure vessel 20, a pressure regulator 40 fluidly connected to the pressure vessel 20 through a releasable seal 24, at least one actuation system 52, and at least one pneumatically-driven jettison mechanism 70. A controller 90 is configured to actuate a dump valve 60 to an open position in response to a control signal to jettison the store.

The pressure vessel 20 defines an internal space for holding a volume of pressurized non-pyrotechnic gas, which provides the source of energy and the transfer mechanism for the ejector system 10. The pressure vessel 20 can be filled with air, nitrogen, or other non-pyrotechnic gases from a high pressure gas source (not shown) such as a pressurized tank, a compressor, a pump, a gas generator, or other known filling means. The energy of the pressurized gas in the pressure vessel 20 is dependent on both the volume of the vessel 20 and the pressure of the gas, both of which can be designed according to the particular needs of the ejector system 10. Preferably, the volume of the pressure vessel 20 is greater than the combined volume of accumulators 54 of the actuation systems 52, described below. Similarly, the pressure vessel 20 is preferably pressurized to a pressure greater than an operating pressure of the actuation systems 52. In one embodiment, the volume of the pressure vessel 20 is between about 10 and 250 cubic inches, and the pressure is between about 3000 and 10,000 psi. The pressure vessel 20 is releasably connected to the pressure regulator 40 such that the pressure vessel 20 can be removed from the ejection system 10, and preferably such that the pressure vessel 20 can be removed from the aircraft. Thus, the pressure vessel 20 can be connected to the pressure regulator 40 before or after take-off of the aircraft and disconnected after use so that the pressure vessel 20 can be replaced or refilled.

The releasable seal 24 of the pressure vessel 20 can be in an open or closed configuration. The releasable seal 24 is fluidly connected to the pressure vessel 20 and the pressure regulator 40 such that the pressure vessel 20 is fluidly connected to the pressure regulator 40 only when the releasable seal 24 is open. The releasable seal 24 can comprise a resealable seal, i.e., a seal that can be released to the open position and then resealed to the closed position, such as a valve. Alternatively, the releasable seal 24 can comprise a non-resealable seal, i.e., a seal that must be replaced in order to re-seal the pressure vessel 20. For example, the releasable seal 24 can comprise a burst disk, which includes a portion of burstable material. The burst disk is released by destructively releasing the burstable material, for example, by bursting, puncturing, stretching, cutting, burning, or otherwise destroying the burstable material. Typically, the burstable material is destroyed when the burst disk is released, and a new burst disk must be affixed to the pressure vessel 20 to reseal the pressure vessel 20. The pressure vessel 20 can be configured such that the releasable seal 24 is released upon installation of the pressure vessel 20 in the ejection system 10. For example, in one embodiment, the pressure vessel 20 is attached to the pressure regulator 40 via a screw or cam connection that is tightened by engaging two mating connectors, and a puncture probe extends within the connection toward the burst disk so that the probe penetrates and bursts the burst disk as the mating connectors are tightened. Alternatively, the ejection system 10 can include an actuator 26 for opening the pressure vessel 20, either by releasing a valve or a burst disk. The actuator 26 can release the seal upon installation of the pressure vessel 20 or at a later time before jettison of the stores. In one embodiment, the actuator 26 comprises an electrical device such as a solenoid, which can release the seal 24 by mechanical reconfiguration or by other known techniques. Preferably, the actuator 26 is controlled by a controller 90 in operable communication therewith. The actuator 26 can also be controlled by a switch that is accessible to the crew of the aircraft. Thus, the releasable seal 24 is configured to keep the pressure vessel 20 hermetically sealed until at least a time when the pressure vessel 20 is installed in the ejection system 10.

The pressure vessel 20 can also incorporate a filter and/or drying unit (not shown), for removing impurities such as debris and/or moisture from the gas. The filter and drying unit can comprise independent devices or an integrated device, such as a canister filter that includes a desiccant material. The filter and/or drying unit can be located between the pressure vessel 20 and the pressure regulator 40 to reduce wear, clogging, and corrosion of the pressure regulator 40 and the other system components. Alternatively, the filter and/or drying unit can be located elsewhere in the system 10, such as downstream of the pressure regulator 40, or omitted from the ejection system 10. A dry gas can reduce system corrosion and, because water freezes at high altitude ambient temperatures, can reduce the likelihood of clogging within the system 10. In a preferred embodiment, the gas is filtered and dried before the pressure vessel 20 is sealed so that no on-board filter and drier are needed.

The pressure regulator 40 is fluidly connected to the releasable seal 24 of the pressure vessel 20 such that the pressure regulator 40 receives the pressurized gas from the pressure vessel 20 when the releasable seal 24 is opened. The pressure regulator 40 is also fluidly connected to the actuation systems 52 and configured to control a flow of the gas to the actuation systems 52. Thus, the pressure regulator 40 is used in conjunction with the releasable seal 24 to control the flow of gas from the pressure vessel 20 to the actuation systems 52.

Figure 2:
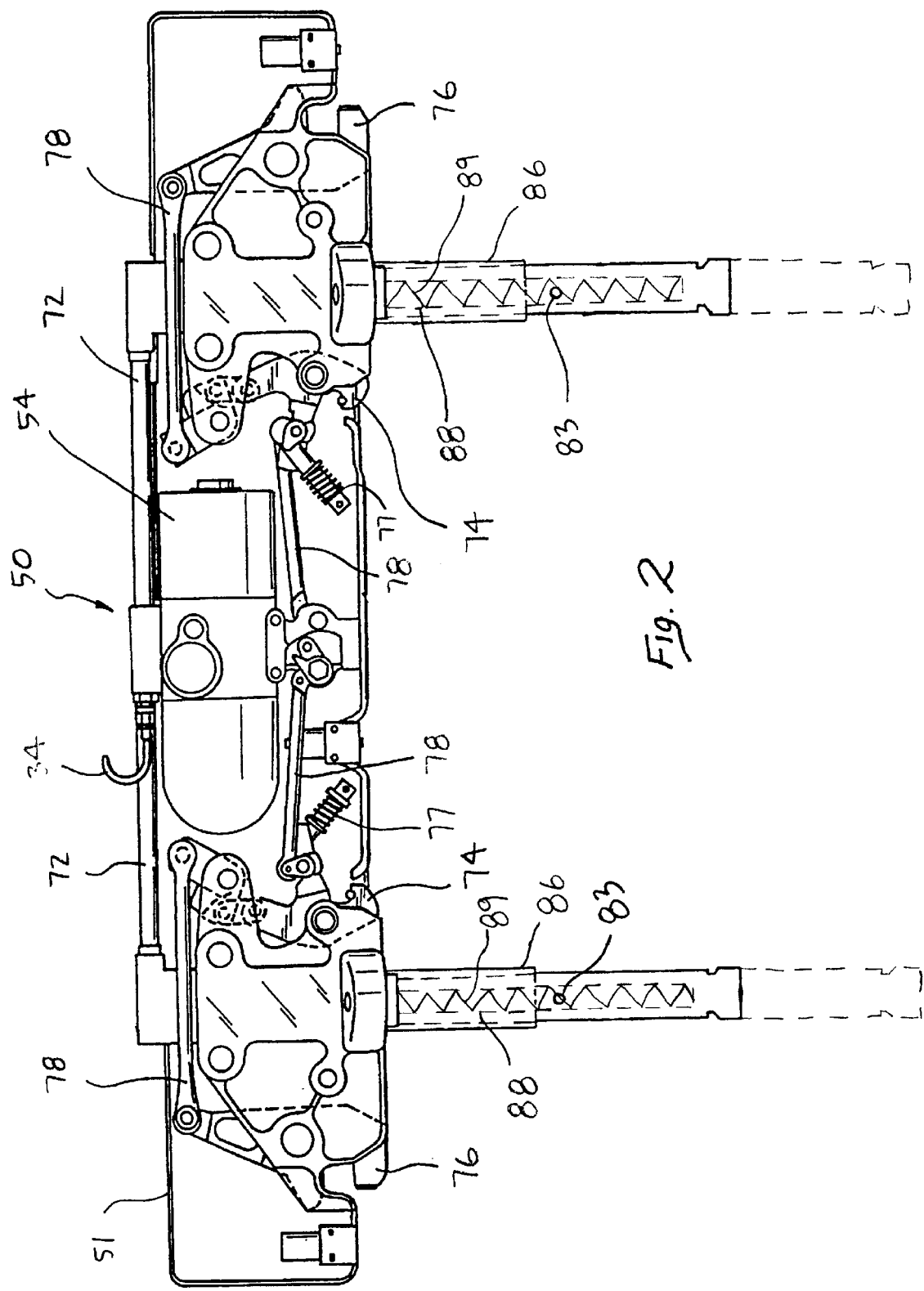
FIG. 2 is a partially cut-away side view of a suspension and release equipment (S & RE) module including an actuation system and an ejection mechanism according to one embodiment of the present invention and showing the range of motion of two ejector pistons.

In the illustrated embodiment of FIG. 1, the ejection system 10 includes two actuation systems 52 and two jettison mechanisms 70, though the ejection system 10 can include any number of actuation systems 52 and jettison mechanisms 70. Each actuation system 52 and associated jettison mechanism 70 can comprise, in combination, a suspension and release equipment (S & RE) module 50, similar to the S & RE module discussed in U.S. Pat. No. 5,583,312, the entirety of which is herein incorporated by reference. Preferably, the ejection system 10 minimizes the changes necessary to adapt the present invention to commercially available S & RE modules. As shown in FIG. 2, each actuation system 52 is housed in a housing 51 with one of the jettison mechanisms 70 for compactness and modularity, but various arrangements could be employed within the scope of the invention, including arrangements wherein some or all of the elements are housed within the aircraft remote from the housing 51.

As shown in FIG. 2, each pneumatically-driven jettison mechanism 70 preferably is configured to releasably retain and jettison one of the stores. The stores are preferably retained by hooks 74, 76, but other retention mechanisms can also be employed including other configurations of hooks, straps, clamps, magnets, and the like. A pair of ejector pistons 86, each of which can be retracted and extended, are used to thrust the stores away from the aircraft. For example, each ejector piston 86 can have multiple telescopic portions that define a common passage 88 therethrough that when filled with pressurized gas causes the piston 86 to extend. The pistons 86 can be biased to the retracted configuration, for example, by one or more springs 89 so that the pistons 86 automatically retract when de-pressurized. Alternatively, the pistons 86 can be retracted manually or by other mechanisms, either before or after the aircraft has returned from its flight. Although each jettison mechanism 70 of the embodiment illustrated in FIG. 2 is shown to include a pair of pistons 86, it is also understood that each mechanism 70 can include any number of pistons 86 such as, for example, a single piston.

Each actuation system 52 includes an accumulator 54, one of the ejection dump valves 60, and a relief valve 56. The pressure regulator 40 and, hence, the pressure vessel 20 are fluidly connected to the accumulator 54 via a manifold conduit 32 and feed lines 34, which extend individually from the manifold conduit 32 to each of the accumulators 54. Enable valves 36 and check valves 38 are provided in the feed lines 34 to further control the flow of gas from the pressure regulator 40 to the individual actuation systems 52. Each of the dump valves 60 is fluidly connected to the respective ejector pistons 86 of the associated jettison mechanism 70 via a dump valve exit line 62 and dump passages 72, which fluidly connect, for example, to the passages 88. Thus, the ejector pistons 86 are actuated by releasing gas from the dump valves 60 through the dump valve exit line 62 and the dump passages 72.

Figure 3:
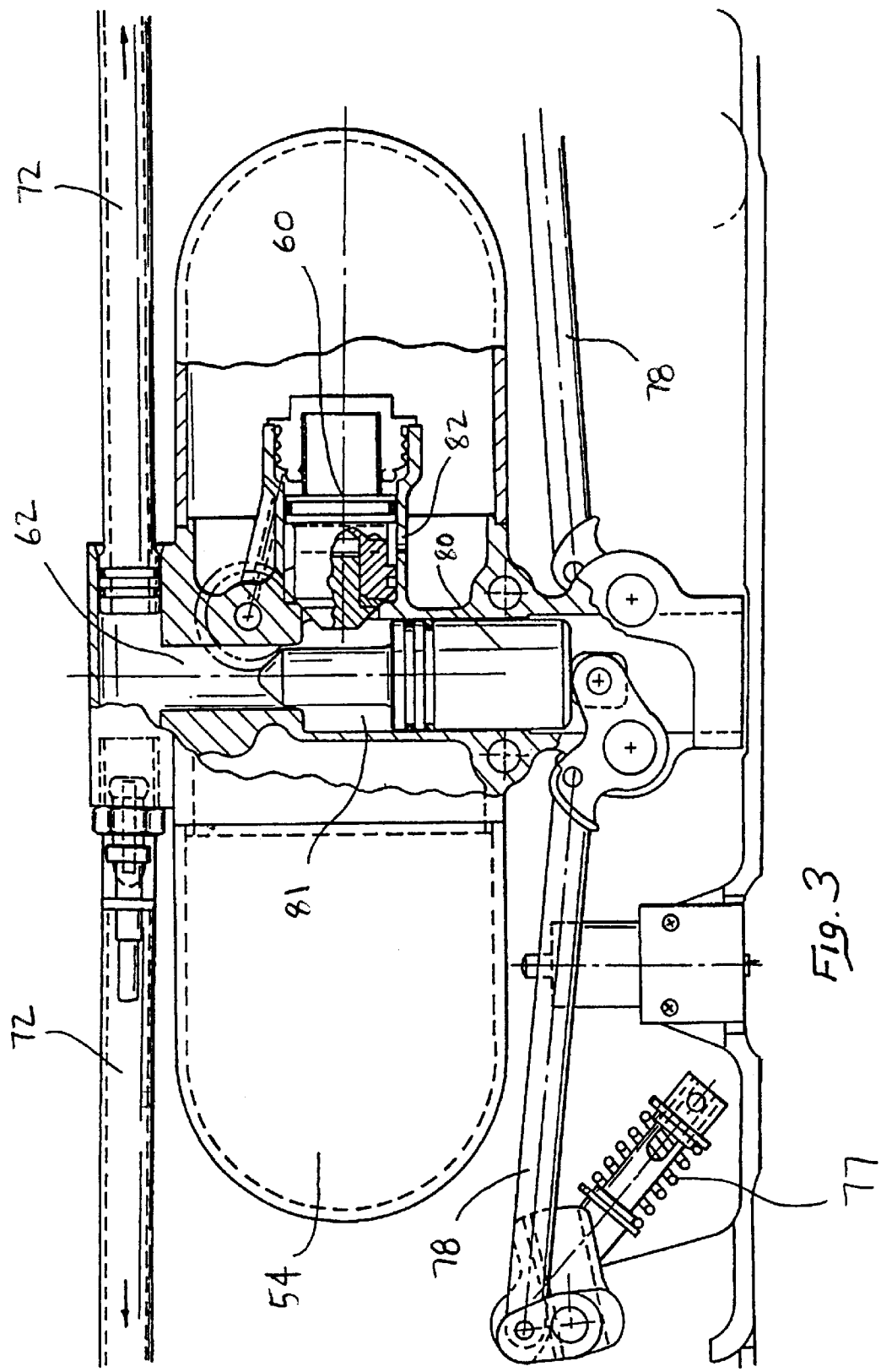
FIG. 3 is an enlarged partial cross-sectional view of the actuation system of the S & RE module of FIG. 2.

In the illustrated embodiment, inside hooks 74 and outside hooks 76 are employed to releasably secure the store to the jettison mechanism 70, but in other embodiments, any number of hooks, including a single hook, can be configured to secure the store as is known in the art. The hooks 74, 76 can be actuated from an illustrated closed position to an open position by means of a hinged hook opening linkage 78, as is also well known in the art, which in turn is driven by a hook opening piston 80, which is reciprocallably slidable in a piston chamber 81, shown in FIG. 3. The hook opening piston 80 is reciprocatively driven when the dump valve 60 is adjusted from the illustrated closed position to an open position, thereby permitting pressurized gas from the accumulator 54 to travel through port 82 into the piston chamber 81, thus acting to drive the piston 80 reciprocatingly downwardly to actuate the hook opening linkage 78. At the same time, pressurized gas is also permitted by the open dump valve 60 to flow through the dump valve exit line 62 and into the dump passages 72, thereby actuating the ejector pistons 86 to thrust the store away from the aircraft simultaneously with its release from the hooks 74, 76. Springs 77 can be provided for biasing the hook opening linkage 78, and thus the hooks 74, 76, to the open and/or closed positions.

In one exemplary manner of operation of the present invention, each S & RE module 50 is initially in an unpressurized state. Loading of a store onto each of the jettison mechanisms 70 of the S & RE module 50 triggers a store present switch 94 provided in each module 50. The store present switch 94 is in electrical communication with the controller 90, and the store present switch 94 communicates a "store present" signal to the controller 90 upon loading of the store. After the store is loaded, the controller 90 releases the releasable seal 24, for example, according to a controller operation program. Upon release of the releasable seal 24, gas flows from the pressure vessel 20 through the manifold conduit 32 and feed lines 34 to the accumulators 54 of the S & RE modules 50. The pressure regulator 40 controls the flow of gas into the accumulators 54 so that the pressure in the accumulators 54 is maintained at a prescribed operating pressure. Additionally, the controller 90 communicates with the enable valves 36 to open and close the enable valves 36 as necessary to fill the accumulators 54. If the ejection system 10 includes multiple S & RE modules 50, the controller 90 can selectively open enable valves 36 of the S & RE modules 50 so that one or more of the S & RE modules 50 is filled while the other S & RE modules 50 are not filled. In one embodiment, the store present switch 94 of each module 50 detects whether or not one of the stores has been mounted on the jettison mechanism 70 and transmits a control signal when the store is present to configure the enable valve 36 to pressurize the accumulator 54. Additionally, each store present switch can be adapted to transmit a control signal when a store is absent to configure the enable valve 36 to prevent gas from flowing from the pressure vessel 20 to the accumulator 54. Thus, each accumulator 54 can be left unfilled if the corresponding S & RE module 50 is not loaded with the store.

The operating pressure, which is approximately 6000 psi in one preferred embodiment, can be maintained in the accumulator 54 by adding gas from the pressure vessel 20 or venting gas through the relief valves 56. For example, each relief valve 56 can be a mechanical over-pressure valve that is mechanically configured to open when the pressure in the respective accumulator 54 exceeds the operating pressure by more than a predetermined pressure interval. Alternatively, pressure sensors (not shown) can be used to monitor the pressure in each of the accumulators 54 and communicate with a pressure controller (not shown) that controls the addition of gas to the accumulators 54 through the pressure regulator 40 and venting of gas through the relief valves 56. Additional gas may be required in one or more of the accumulators 54 due to ambient temperature and pressure changes, for example, due to altitude changes of the aircraft. Alternatively, the accumulators 54 can be vented in response to changes in altitude, temperature, or other conditions. The accumulators 54 can also be vented after the store has been jettisoned from each accumulator 54, either before or after the aircraft lands. For example, after the aircraft lands, a ground crew member can manually actuate one or more of the relief valve 56 to release the pressurized gas from the accumulators 54.

The controller 90 is also in electrical communication with an ejection initiator, such as a store management system (SMS) 92 as is known in the art for controlling the release and jettison of stores, or a manual release switch (not shown) that is activated by a member of the aircraft crew. Upon activation, the ejection initiator issues a control signal to eject one or more of the stores. The controller 90 receives the control signal and actuates the corresponding dump valve 60 to the open position, thereby permitting pressurized gas from the accumulator 54 to flow through port 82 into the piston chamber 81. The gas drives the hook opening piston 80 downwardly to release the hooks 74, 76 while also flowing through the dump valve exit line 62 and the passages 72 to pressurize and drive each of the ejector pistons 86 to their extended positions. Thus, the gas not only is the source of energy, but also the transfer mechanism to release the stores. The hooks 74, 76 release the store, and the ejector pistons 86 thrust the store clear of the aircraft. As the hooks 74, 76 open, the store present switch 94 detects a "store absent" condition, which is transmitted to the controller 90. The controller 90 can close the enable valves 36 and prevent additional gas from flowing to the S & RE module 50. At the end of the ejector piston stroke, vent ports 83 are exposed, as shown in FIG. 2, preferably discharging substantially all residual accumulator pressure and permitting the springs 89 to retract the ejector pistons 86 to their retracted position. Thus, the S & RE module 50 may be operated to remain fully discharged and dormant after firing its store, resulting in both greater flight safety and a safer environment for working on the aircraft after landing. Alternatively, it may sometimes be desirable to retain some of the residual accumulator pressure to reduce the charge time and gas necessary to recharge the system for the next firing.

Many modifications and other embodiments of the inventions set forth herein will come to mind to one skilled in the art to which these inventions pertain having the benefit of the teachings presented in the foregoing descriptions and the associated drawings. For example, the controller 90 and the SMS 92 can be individual devices as illustrated in FIG. 1, a single integrated device, or can comprise any number of separate components. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A store ejection system for mounting at least one jettisonable store on an aircraft, the store ejection system using a gas as the source of energy and a transfer mechanism and comprising:

an on-board pressure vessel of pressurized non-pyrotechnic gas for providing the source of energy and the transfer mechanism;

a releasable seal configured to hermetically seal said pressure vessel, said releasable seal adapted to be released from a closed position to an open position;

a pressure regulator fluidly connected to said releasable seal and configured to control a flow of the gas from said pressure vessel when said releasable seal is configured in the open position;

at least one actuation system comprising an accumulator fluidly connected to said pressure regulator for receiving and storing the gas from said pressure vessel at a specified operating pressure, a dump valve for controlling a flow of gas from said accumulator, and a controller for actuating said dump valve to an open position in response to a control signal to jettison the store; and at least one pneumatically-driven jettison mechanism for releasably retaining the store, each jettison mechanism fluidly connected to one of said dump valves such that actuating each dump valve to the open position releases the pressurized gas in a respective accumulator to flow to a respective jettison mechanism, thereby actuating the jettison mechanism to jettison the respective store;

wherein said pressure vessel is releasably connected to said pressure regulator and said releasable seal is configured to be released after said pressure vessel is connected to said pressure regulator such that said releasable seal hermetically seals said pressure vessel before said pressure vessel is connected to said pressure regulator.

2. A store ejection system according to claim 1, wherein said releasable seal comprises a valve.

3. A store ejection system according to claim 1, wherein said releasable seal comprises a burst portion adapted to be destructively released.

4. A store ejection system according to claim 1, further comprising an actuator for releasing said releasable seal.

5. A store ejection system according to claim 1, wherein said releasable seal is configured to be released upon connection of said pressure vessel to said pressure regulator.

6. A store ejection system according to claim 1, wherein said pressure vessel defines an interior space of between about 10 and 250 cubic inches.

7. A store ejection system according to claim 1, wherein the gas in said pressure vessel is pressurized to between about 3000 and 10,000 psi.

8. A store ejection system according to claim 1, wherein said pressure regulator is adapted to control the flow of the gas from said pressure vessel and thereby maintain the specified operating pressure in said at least one actuation system.

9. A store ejection system according to claim 1, comprising a plurality of said jettison mechanisms and a corresponding plurality of said actuation systems, the store ejection system further including a manifold line fluidly connecting said pressure vessel to each actuation system.

10. A store ejection system according to claim 9, further comprising a plurality of enable valves, wherein each enable valve is fluidly connected to said manifold line and configured to control the flow of the gas from said pressure regulator to a respective actuation system.

11. A store ejection system according to claim 1, wherein each actuation system further includes a relief valve for venting the gas from a respective accumulator of each actuation system.

12. A store ejection system according to claim 1, wherein each jettison mechanism further comprises at least one hook for releasably retaining the store, said at least one hook being actuated to release the store from said jettison mechanism by the pressurized gas exiting a respective accumulator through a respective dump valve.

13. A store ejection system according to claim 12, wherein each jettison mechanism further comprises at least one ejector piston for forcibly jettisoning the store away from the aircraft when said at least one hook has been actuated to a release position, said at least one ejector piston being actuated to jettison the store by the pressurized gas exiting said accumulator through said dump valve.

* * * * *